(12) United States Patent
Robert et al.

(10) Patent No.: US 8,265,211 B2
(45) Date of Patent: Sep. 11, 2012

(54) DEVICE AND METHOD FOR IMPROVING THE CARRIER-TO-NOISE RATIO FOR A RECEIVER WITH DIVERSITY

(75) Inventors: Jean-Luc Robert, Betton (FR); Jean-Yves Le Naour, Pace (FR); Jean-François Pintos, Bourgarre (FR)

(73) Assignee: Thomson Licensing, Boulogne-Billancourt (FR)

(*) Notice: Subject to any disclaimer, the term of this patent is extended or adjusted under 35 U.S.C. 154(b) by 867 days.

(21) Appl. No.: 11/651,769

(22) Filed: Jan. 10, 2007

(65) Prior Publication Data
US 2007/0165758 A1    Jul. 19, 2007

(30) Foreign Application Priority Data

Jan. 13, 2006    (FR) ..................... 06 50124

(51) Int. Cl.
*H04B 7/10* (2006.01)
(52) U.S. Cl. ......... 375/347; 375/267; 375/324; 375/148
(58) Field of Classification Search ............... 375/347
See application file for complete search history.

(56) References Cited

U.S. PATENT DOCUMENTS

| | | | |
|---|---|---|---|
| 3,810,036 A * | 5/1974 | Bloedorn | 331/15 |
| 4,326,294 A | 4/1982 | Okamoto et al. | |
| 4,586,048 A * | 4/1986 | Downie | 342/379 |
| 4,616,255 A * | 10/1986 | Nakagaki et al. | 348/290 |
| 5,237,288 A * | 8/1993 | Cleveland | 330/107 |
| 5,379,046 A | 1/1995 | Tsujimoto | |
| 2002/0072344 A1* | 6/2002 | Souissi | 455/296 |
| 2004/0185815 A1* | 9/2004 | Fukuda et al. | 455/296 |

OTHER PUBLICATIONS

GB 1 433 588 A (Cit Alcatel) Apr. 28, 1976, *p. 1, Colonne de guache, ligne 12-ligne43*, *p. 1, colonne de deroite, ligne 45-ligne62*p. 2, colonne de drotie, ligne 79-p. 3, colonne de gauche, ligne 32*figure 1.
Search Report dated Nov. 1, 2006.

* cited by examiner

*Primary Examiner* — Lihong Yu
(74) *Attorney, Agent, or Firm* — Tutunjian & Bitetto, P.C.

(57) ABSTRACT

The method of improving the carrier-to-noise ratio for a receiver with diversity, and the associated device, consists, after extracting, by phase shifting, the noise component of the signals to be demodulated, in optimizing the cancellation of the useful component via a feedback loop acting on the phase shifter and in summing the noise component in phase and in phase opposition with these signals to improve the carrier-to-noise ratio.

7 Claims, 1 Drawing Sheet

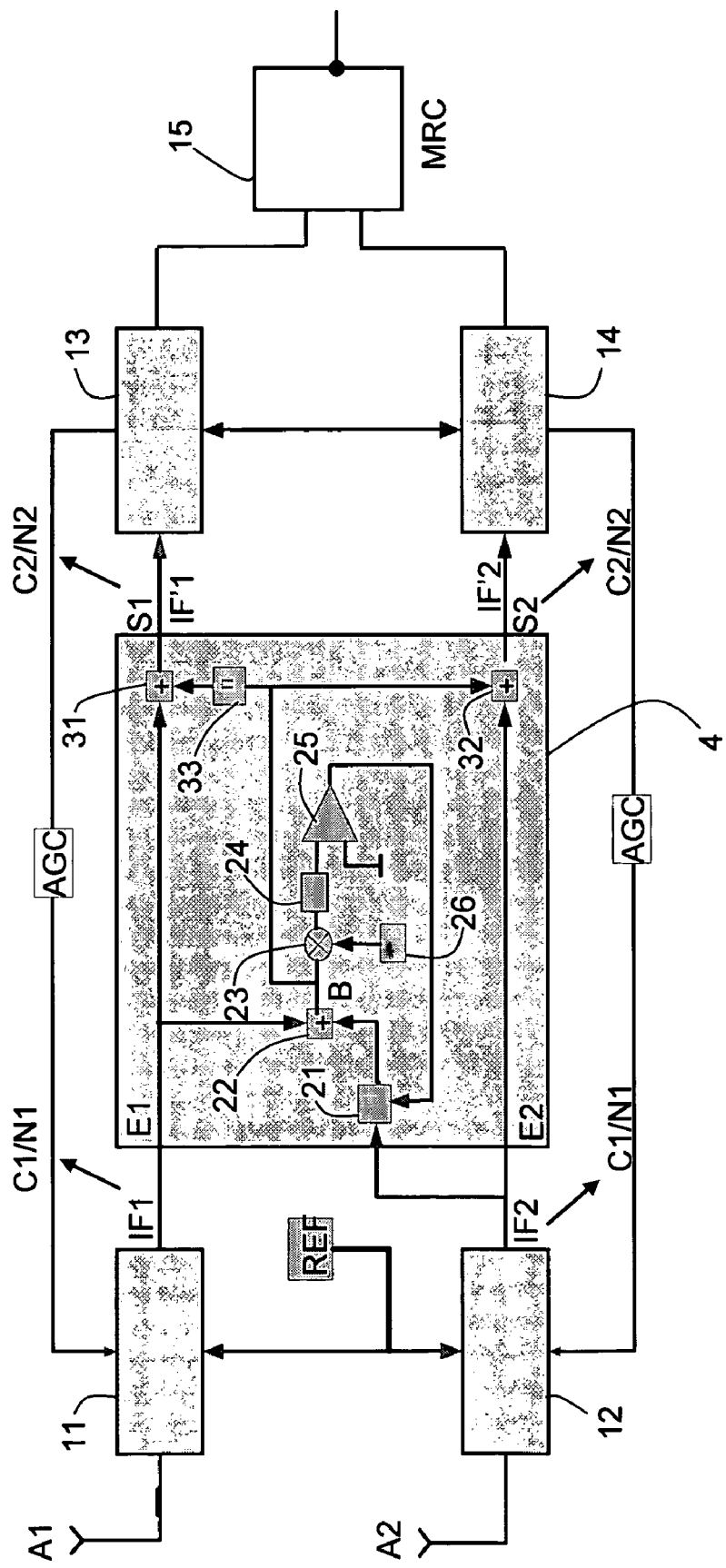

DEVICE AND METHOD FOR IMPROVING THE CARRIER-TO-NOISE RATIO FOR A RECEIVER WITH DIVERSITY

This application claims the benefit, under 35 U.S.C. §119 of French Patent Application 0650124 filed Jan. 13, 2006.

FIELD OF THE INVENTION

The invention relates to a device and a method for improving the carrier-to-noise ratio for a receiver with diversity. It applies in particular to the context of the deployment of digital terrestrial television (DTT) networks.

DESCRIPTION OF THE PRIOR ART

The digital terrestrial transmission (broadcast) systems have recently emerged as the way to convey multimedia content to mobile, indoor and even handheld designs.

Nevertheless, significant reception problems in the case of mobile reception have been revealed. Unlike an analogue received signal on which the degradation is always progressive, in the case of digital terrestrial, there is an abrupt change from a very good reception to a total loss of the image and even of the data.

In the context of the European DVB-T standard used for digital terrestrial transmissions, it is possible to obtain a more robust reception by the use of more than one antenna (typically 2) and to combine the signals obtained from each of the receive channels in a digital processing circuit.

The signals obtained respectively from two receive channels are recombined and there is then obtained an optimal MRC (maximum ratio combining) type result in the context of an indoor portable or mobile reception.

Diversity is therefore now one of the solutions that can be used to improve the reception in a given physical environment (fixed or mobile).

However it is not sufficient to ensure a good reception quality. This is because, in a disturbed environment, the indoor or mobile reception is particularly difficult because of both the low level of the signal received and the very low signal-to-noise ratio due to the fading effects for indoor reception and the Doppler effect for mobile reception. Major disturbances at the channel end can ultimately lead to an abrupt break in reception or the appearance of macroblocks in the image. For this, the DVB-T standard indicates minimum carrier-to-noise (C/N) ratio values required to ensure an error-free transmission.

However, experience and various field trials carried out show that these values are inadequate. Thus, it has become necessary to apply to the reception solutions with which to improve this carrier-to-noise ratio.

SUMMARY OF THE INVENTION

The invention aims to solve this problem by proposing a method of improving the carrier-to-noise ratio of a signal to be demodulated from at least two receive subsystems of a digital receiver with diversity. It consists, for two synchronized receive subsystems, in extracting the signal representing the noise component of the signals by cancelling the useful component of the modulated signal then forming a feedback loop to optimize the cancellation of the useful component and finally in adding this signal representing the noise component in phase to one of the two signals to be demodulated and in phase opposition to the other of the two signals to be demodulated.

This method makes it possible in particular to improve the performance levels of the receiver in terms of carrier-to-noise (C/N) ratio at the input of the demodulator, in order to ensure a quasi error-free (QEF) transmission.

Preferably, the step for extracting the noise component of the signals consists in adding the two signals to be demodulated at intermediate frequency, one of the signals being phase-shifted by 180°.

Preferably, the feedback loop consists in introducing an additional phase shift on the phase-shifted signal so as to optimize the cancellation of the wanted signal.

The invention also consists of a device for improving the carrier-to-noise ratio of a signal to be demodulated from at least two receive subsystems of a digital receiver with diversity, each subsystem including, upstream of the device, a tuner element, and downstream, a demodulator. The device comprises, for two receive subsystems including synchronized tuners,

- means for extracting the signal representing the noise component of the signals from two receive subsystems;
- means forming a feedback loop to minimize the residual wanted signal at intermediate frequency at the output of the summer;
- means of summing, in phase, this signal representing the noise component with one of the two signals to be demodulated and, in phase opposition, this signal with the other of the two signals to be demodulated to minimize the correlated noise contributions on each channel.

Preferably, the means for extracting the noise component of the signals comprise a summer for summing in phase opposition the signals at intermediate frequency from the two receive subsystems.

Preferably, the means forming the feedback loop comprise a mixer driven at the frequency of a local oscillator identical to the intermediate frequency, a low-pass filter for isolating the resultant continuous component and an error amplifier delivering the control voltage of the phase shifter to introduce an additional phase shift on the phase-shifted signal.

The invention also consists of a digital receiver with diversity comprising at least two receive subsystems and incorporating in at least two of the receive subsystems a device for improving the carrier-to-noise ratio of the signal to be demodulated.

DESCRIPTION OF THE DRAWINGS

The characteristics and advantages of the abovementioned invention, and others, will become more clearly apparent from reading the following description, given in relation to the appended drawings, in which:

FIG. 1 diagrammatically represents a receiver with diversity provided with a device according to the invention.

FIG. 1 diagrammatically represents a receiver with diversity provided with the device according to the invention. Conventionally, as known to those skilled in the art, it comprises at least two antennas A1, A2 for receiving the electromagnetic signals in diversity mode. A receive subsystem is associated with each antenna. It mainly comprises a tuner element 11, 12 and a demodulation element 13, 14 for selecting and demodulating the received signal.

DESCRIPTION OF THE PREFERRED EMBODIMENTS

The device according to the invention is inserted, as shown in FIG. 1, between the tuner and demodulator elements of two UHF signal receive subsystems associated with the antennas A1 and A2. Naturally, the receiver can comprise several receive subsystems each associated with one antenna. It will be possible to insert a number of devices according to the invention between various pairs of receive subsystems, for example between the subsystems associated with the antennas A1 and A2 or other antennas. All combinations are possible, bearing in mind that the principle of the invention is based on comparing signals obtained from two separate subsystems to improve the signal-to-noise ratio.

Synchronization between the two selected subsystems is produced at the two synthesizers driving the two tuners by the use of a common reference clock. The signals at intermediate frequency IF1, IF2 selected by the tuner 11, 12 at the inputs (E1 and E2) of the device 4, are therefore synchronized and have a carrier-to-noise ratio C1/N1.

At the outputs S1 and S2 of the device 4, the signals IF1' and IF2' have a carrier-to-noise ratio C2/N2 and are then applied to the demodulators 13 and 14 respectively to be demodulated then recombined by an MRC circuit 15 in a manner known to those skilled in the art.

In order to ensure a quasi error-free (QEF) transmission, the performance levels of the receiver in terms of carrier-to-noise ratio at the input of the demodulator C2/N2 must be improved significantly in the framework of an indoor reception or of a mobility context.

The device 4 includes a feedback loop that can be used to cancel the useful component of the signals modulated at intermediate frequency IF1, IF2.

The basic principle of the method implemented here is based on the one hand on the random nature of the noise generated in a receive subsystem and on the other hand on the very large gain needed to convert the UHF signal received by the antenna to intermediate frequency. This gain controlled by the OFDM demodulator by the AGC gain control loop makes it possible to absorb all the reception dynamic range and can reach, for example, 70 to 80 dB depending on the receive configuration and the transmitted modulation. The result is that the resultant noise components generated in the two separate receive subsystems and transposed to intermediate frequency respectively at IF1 and IF2 are decorrelated.

As seen previously, the use of a common reference driving the respective synthesizers of the two tuners renders the received signals transposed to intermediate frequency IF1, IF2 synchronous. The result of this is therefore that a summing in phase opposition of the signals at intermediate frequency IF1 and IF2 affected by the channel filtering cancels the useful component of the modulated signal while retaining a noise component.

A phase-shifter 21 is used to phase shift one of the intermediate frequency signals obtained from one of the receive channels. These two signals are then summed by the summer 22. The summing in phase opposition of the signals at intermediate frequency IF1 and IF2 should therefore make it possible to cancel the signal to be transmitted, called wanted signal, while retaining the noise component. Now, this cancellation of the useful component of the modulated signal is not total. The noise component accompanied by a residual component is therefore found at the output of the summer 22. A feedback loop, consisting of a mixer 23, a low-pass filter 24 and an error amplifier 25, is used to optimize the cancellation of this useful component by delivering a control signal to the phase-shifter circuit 21.

For this, the mixer 23 is driven at the frequency of the local oscillator LO 26, identical to the frequency of the local oscillator, generating intermediate frequency for the tuners—in our example, this frequency is 36 MHz. The low-pass filter 24 is used to isolate the resultant continuous component of the noise signal at intermediate frequency. This component is compared to a reference signal by the error amplifier 25 which delivers a control voltage to the phase-shifter 21. The additional phase shift introduced by this phase-shifter will make it possible, when summing the phase-shifted signal IF2 and the non phase-shifted signal IF1, to obtain a resultant signal B which therefore corresponds to the noise component of the intermediate frequency signals IF1 and IF2.

The second part of the device 4 applies the following step of the method according to the invention. This part comprises a phase-shifting element 33 for phase-shifting the signal by p and summers 31, 32. These are used to correlate a part of the resultant noise component B in phase and in phase opposition with the signal present at the respective inputs corresponding to the channel 1 or the channel 2. The result of this is that it is thus possible to minimize the correlated noise contributions on each channel by a summing in phase and in phase opposition.

Experimentally, and by way of example, the concept described here provides a gain on the carrier-to-noise C/N ratio of up to 4 dB on one of the channels at the input of the demodulators. In mobile reception mode, the difference needed on the carrier-to-noise C/N ratio compared to a fixed-mode reception can be 8 dB for a 16QAM ⅔ modulation. For other modulation types, for example 16QAM ½ or a 16QAM ¾, or even 64QAM ⅔, in mobile or portable reception mode, these differences will have similar values of around 7 or 8 dB. For a given minimum required C/N, a noise reduction of 4 dB is equivalent to a sensitivity gain of 4 dB. Since this gain is simultaneously presented to both inputs of the demodulators, the gain provided by the diversity is accordingly improved.

With such a device, it is therefore possible to envisage receiving greater information rates for a given receive configuration. A mobile receiver being in a situation at the limit of reception of a transmission in 16-QAM ⅔ type modulation mode for which the required C/N is 15 dB can, with the proposed device, or more comfortably receive this transmission or receive transmissions in 64-QAM ⅔ mode for which the required C/N is 19 dB.

It is therefore clearly apparent that the device proposed here makes it possible, in the context of a digital terrestrial reception with diversity, to significantly increase the performance levels of the receiver by a notable improvement of the signal-to-noise ratio before demodulation. The result of this is a better coverage rate for a fixed configuration or an improvement in the reception performance for the more critical mobile and portable modes or, as described previously, the possibility of receiving greater information rates for a given receive configuration.

The invention claimed is:

1. A method of improving the carrier-to-noise ratio of a signal to be demodulated which is modulated at an intermediate frequency and diversity received from at least two synchronized receive subsystems of a digital receiver, the method comprising steps of:

Extracting a signal B representing the noise component of the received signals from the two receive subsystems by cancelling the useful component of the signal to be demodulated;

forming a feedback loop at the intermediate frequency to optimize the cancellation of the useful component of the modulated signal;

adding the signal B representing the noise component in phase to one of the two received signals to be demodulated and in phase opposition to the other of the two received signals to be demodulated to minimize correlated noise contributions; and applying the resulting signals to corresponding demodulators of the synchronized receive subsystems.

2. The method of improving the carrier-to-noise ratio of a signal according to claim 1, wherein the step for extracting the noise component of the received signals comprises adding the two received signals to be demodulated at the intermediate frequency, one of the received signals being phase-shifted by 180°.

3. The method of improving the carrier-to-noise ratio of a signal according to claim 2, wherein the step of forming a feedback loop further comprises introducing an additional phase shift on the phase-shifted signal.

4. A device for improving the carrier-to-noise ratio of a signal to be demodulated, which is modulated at an intermediate frequency by a frequency of a local oscillator and diversity received from at least two receive subsystems of a digital receiver having synchronized tuner elements, the signal being received as received signals from the at least two receive subsystems, the device being disposed downstream of each synchronized tuner element and upstream of each demodulator in the respective two receive subsystems, the device comprising:
    means for extracting a signal B representing the noise component of the received signals from the two receive subsystems by cancelling the useful component of the signal to be demodulated;
    means for forming a feedback loop at the intermediate frequency in order to optimize the cancellation of the useful component of the modulated signal;
    means for summing, in phase, this signal B representing the noise component with one of the two received signals to be demodulated and, in phase opposition, this signal B with the other of the two received signals to be demodulated to minimize correlated noise contributions; and
    means for applying the resulting signals to the corresponding demodulators of the receive subsystems.

5. The device according to claim 4, wherein the means for extracting the signal B representing the noise component of the received signals comprises a summer for adding the received signals to be demodulated at the intermediate frequency, wherein one of the received signals is phase shifted 180° by a phase shifter.

6. The device according to claim 5, wherein the means for forming the feedback loop comprises a mixer driven at the frequency of the local oscillator, a low-pass filter for isolating a resultant continuous component at the intermediate frequency and an error amplifier delivering a control voltage of the phase shifter used to introduce an additional phase shift on the phase-shifted signal.

7. A digital receiver with diversity comprising:
    at least two receive subsystems;
    a device for improving the carrier-to-noise ratio of a signal to be demodulated and which is modulated at an intermediate frequency by a frequency of an oscillator, the signal being diversity received from the at least two receive subsystems, the device being disposed downstream of a tuner element and upstream of a demodulator of the respective two receive subsystems, the two receive subsystems having synchronized tuner elements, the device for improving the carrier-to-noise ratio of a signal to be demodulated further comprises:
    means for extracting a signal B representing the noise component of the received signals from the two receive subsystems by cancelling the useful component of the signal to be demodulated;
    means for forming a feedback loop at the intermediate frequency to optimize the cancellation of the useful component of the modulated signal;
    means for summing, in phase, this signal B representing the noise component with one of the two received signals to be demodulated and, in phase opposition, this signal B with the other of the two received signals to be demodulated to minimize correlated noise contributions; and
    means for applying the resulting signals to the corresponding demodulators of the receive subsystems.

* * * * *